(12) United States Patent
Negulescu

(10) Patent No.: US 11,708,168 B2
(45) Date of Patent: Jul. 25, 2023

(54) AIRCRAFT PROPULSION UNIT COMPRISING AN ASSEMBLY OF AT LEAST TWO COAXIAL SHAFTS, ONE BEING CONNECTED TO THE FAN AND THE OTHER TO THE ASSEMBLY OF FIXED BLADES

(71) Applicant: Airbus Operations (S.A.S.), Toulouse (FR)

(72) Inventor: Camil Negulescu, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 1064 days.

(21) Appl. No.: 16/452,634

(22) Filed: Jun. 26, 2019

(65) Prior Publication Data

US 2020/0002013 A1   Jan. 2, 2020

(30) Foreign Application Priority Data

Jun. 29, 2018   (FR) ...................................... 1856035

(51) Int. Cl.
*B64D 27/02* (2006.01)
*B64D 27/20* (2006.01)
*B64C 21/01* (2023.01)
*B64D 35/00* (2006.01)

(52) U.S. Cl.
CPC .............. *B64D 27/02* (2013.01); *B64C 21/01* (2023.01); *B64D 27/20* (2013.01); *B64D 35/00* (2013.01)

(58) Field of Classification Search
CPC ................................. B64C 21/00; B64D 27/20
See application file for complete search history.

(56) References Cited

U.S. PATENT DOCUMENTS 3,491,536 A * 1/1970 Hadaway .................. F02C 7/06
  60/798
4,306,755 A * 12/1981 Roberts ................... F01D 5/026
  384/494

(Continued)

FOREIGN PATENT DOCUMENTS

EP   3 121 430 A1   1/2017
EP   3 153 401 A1   4/2017

OTHER PUBLICATIONS

English Translation of DE-3705026-A1 (Year: 1987).*
French Search Report for Application No. 1856035 dated Mar. 14, 2019.

*Primary Examiner* — Nicholas McFall
*Assistant Examiner* — Marisa V Conlon
(74) *Attorney, Agent, or Firm* — KDW Firm PLLC

(57) ABSTRACT

An aircraft propulsion unit includes a drive unit with a static part and a rotary part which rotates a fan situated downstream from the drive unit, an assembly of fixed blades situated downstream from the fan, and a nacelle in which the fan and the assembly of fixed blades are accommodated. The propulsion unit also includes an assembly of at least two coaxial shafts, wherein a fan shaft connects the fan to the rotary part, and a stator blading shaft connecting the assembly of fixed blades to the static part extends concentrically, and for at least part of its length in the interior of the fan shaft. This rigid and compact configuration limits the variations of distance between the end of the fan blades and a fan housing situated in the inner duct of the nacelle.

9 Claims, 5 Drawing Sheets

(56) References Cited

U.S. PATENT DOCUMENTS

| | | | | |
|---|---|---|---|---|
| 7,090,165 | B2* | 8/2006 | Jones | F02C 7/00 244/54 |
| 10,017,270 | B2* | 7/2018 | Becker | F02K 3/062 |
| 10,358,228 | B2* | 7/2019 | Marrinan | B64D 29/04 |
| 10,822,100 | B2* | 11/2020 | Dindar | H02K 7/1823 |
| 11,084,595 | B2* | 8/2021 | Murrow | B64D 29/04 |
| 2014/0010652 | A1* | 1/2014 | Suntharalingam | B64D 27/02 475/5 |
| 2017/0081013 | A1 | 3/2017 | Marrinan et al. | |

* cited by examiner

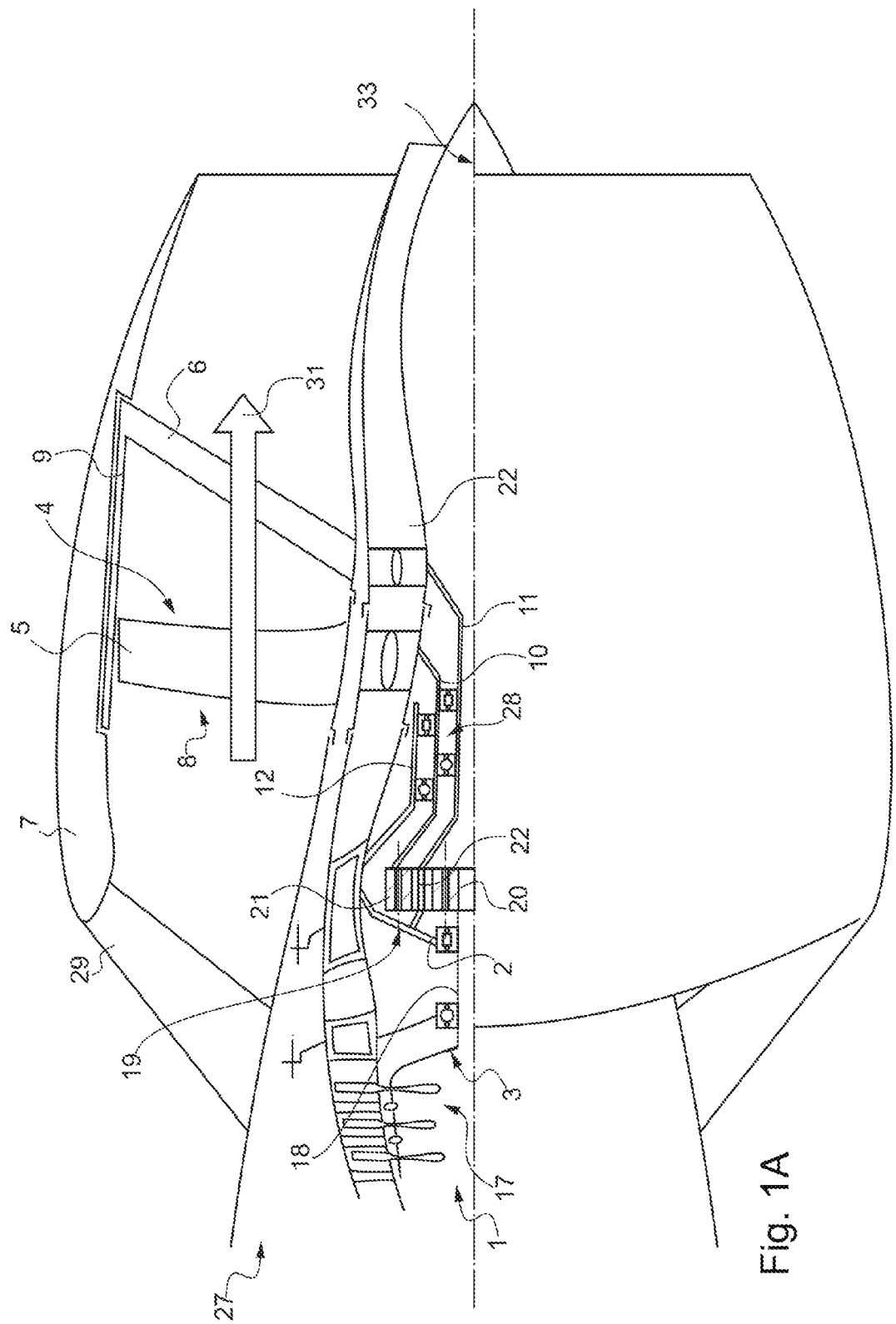

AIRCRAFT PROPULSION UNIT COMPRISING AN ASSEMBLY OF AT LEAST TWO COAXIAL SHAFTS, ONE BEING CONNECTED TO THE FAN AND THE OTHER TO THE ASSEMBLY OF FIXED BLADES

CROSS-REFERENCE TO RELATED APPLICATION

This application claims priority to French Patent Application FR 1856035, filed Jun. 29, 2018, the entire disclosure of which is incorporated by reference herein.

TECHNICAL FIELD

The disclosure herein relates to aircraft propulsion units, and more specifically to their architecture and their implantation on an aircraft.

BACKGROUND

Commercial aircraft mostly have a general architecture with a fuselage, a wing unit comprising two wings, and a rear tail fin. Aircraft of this type additionally comprise one or a plurality of propulsion units, the most commonly used being turbojets. The propulsion units can be implanted on the aircraft according to different configurations. Most commonly, they are suspended below the wings by support struts, but they can also be secured on the rear of the fuselage by struts, or at the tail fin.

When the aircraft is travelling in the air, its outer surfaces affect the flow of air. In particular, when an aerodynamic profile is travelling in the air, a boundary layer is created on the surface of this aerodynamic profile. This boundary layer corresponds to an area in which the speed of flow of the air is slowed down by the viscosity of the air in contact with the surfaces of the profile.

In general, the propulsion units are configured such that they do not aspirate this boundary layer being created on the aerodynamic surfaces of the aircraft. For this purpose, the propulsion units are most commonly mounted so that their air input is situated in a free flow of air, i.e. a flow which is disrupted little or not at all by the surfaces of the aircraft. This is the case for example when the propulsion units are suspended below the wing unit, or at a distance from the fuselage on the rear part of an aircraft.

However, the ingestion by the propulsion unit of this boundary layer has certain advantages which improve the efficiency of the propulsion of these aircraft, and reduce their specific consumption, i.e. the consumption of fuel relative to the mass of the aircraft. In order to benefit from these advantages, a propulsion unit can thus be configured to ingest the boundary layer. Propulsion units of this type are generally designated by the acronym BLI, standing for Boundary Layer Ingestion. A possible configuration of a propulsion unit of the BLI type on an aircraft is its implantation on the rear part of the fuselage.

An example of a BLI propulsion unit implanted on the rear part of the fuselage is described in patent application US-A1-2017/0081013. Hereinafter, the relative axial positions of the components of the propulsion unit will be indicated relative to the direction of flow of propulsion gas passing through it. An aircraft propulsion unit as described in the aforementioned document according to the prior art comprises a drive unit with a static part and a rotary part, and a fan with fan blades which is rotated by the rotary part of the drive unit. The fan is situated downstream from the drive unit. There is also an assembly of fixed blades situated downstream from the fan, and a nacelle which has a fan housing in its lower part at the fan and the assembly of blades.

In this configuration, the nacelle is connected mechanically to the fuselage of the aircraft by structural braces which are generally streamlined and situated upstream from the fan. The loads derived from the nacelle and the assembly of fixed blades are transmitted to the fuselage by the structural braces, which must have dimensions suitable for this purpose. Thus, under the effect of the substantial aerodynamic stresses exerted on the nacelle and the assembly of fixed blades, the latter are displaced relative to the fuselage and to the fan as a result of the deformation of the structural braces. Consequently, the distance between the end of the blades of the fan and the fan housing can vary considerably on the periphery of the fan according to the conditions and phases of flight of the aircraft. The lack of rigidity of the assembly formed by the nacelle, the assembly of fixed blades and the fan, means that the gap between the end of the blades of the fan and the fan housing must be large enough to accept these deformations without risk of friction of the fan blades on the housing. The size of this gap has a significant negative impact on the performance and efficiency of the propulsion unit.

SUMMARY

The disclosure herein discloses an aircraft propulsion unit and an aircraft rear part comprising at least one propulsion unit which solves this problem.

Thus, the aircraft propulsion unit according to the disclosure herein comprises an assembly of at least two coaxial shafts, wherein a fan shaft connects the fan to the rotary part of the drive unit, and a stator blading shaft connects the assembly of fixed blades to the static part of the drive unit, and extends concentrically, and for at least part of its length, in the interior of the fan shaft.

The arrangement of an assembly of coaxial shafts makes it possible to create a mechanical connection between the fan, the fixed blade assembly and the housing of the fan. The fan/fixed blade/housing assembly thus provided is more compact and more rigid than that according to the prior art, thus limiting the deformations without requiring a reinforcement of the structural braces connecting the nacelle to the rear part of the fuselage.

In a particularly advantageous configuration of the aircraft propulsion unit, the assembly of coaxial shafts also comprises a fan hub which is connected to the static part of the drive unit and extends concentrically around the fan shaft over at least part of its length.

Preferably, the aircraft propulsion unit additionally comprises at least a first module of bearings mounted between the stator blading shaft and the fan shaft, and a second module of bearings mounted between the fan shaft and the fan hub.

More particularly, at least one of the first and second bearing modules comprises at least one ball bearing and one roller bearing.

Advantageously, the drive unit of the aircraft propulsion unit comprises a motor with a rotor and a planetary gear train which is connected to the rotor of the motor and rotates the fan. The planetary gear train comprises an input planet wheel which is connected to the rotor of the motor, an output planet wheel in the form of a crown, which is connected to the fan shaft and rotates it, and a fixed planet carrier which is connected to the static part of the drive unit and to the stator blading shaft.

In addition, the aircraft propulsion unit comprises an auxiliary fan with a reduced radius, with one or a plurality of stages, disposed between the fan and the assembly of fixed blades. The auxiliary fan is designed to re-pressurise the flow of propulsion gas flowing at the roots of the fan blades and the roots of the assembly of fixed blades.

Preferably, in the aircraft propulsion unit, the fan blades are mounted via their root on a fan disc in order to form the fan. A mainly axial extension of the fan disc extends downstream from the latter and rotates the auxiliary fan. An auxiliary fan fairing surrounds the auxiliary fan and is connected to the assembly of fixed blades.

Advantageously, in the aircraft propulsion unit, the fan housing situated in the interior of the nacelle is mechanically independent from the nacelle and is retained by the assembly of fixed blades to which it is connected.

Alternatively, in the aircraft propulsion unit, the fan housing is connected mechanically to the nacelle, and is retained by the assembly of fixed blades to which it is connected; the nacelle is thus connected to the static part of the drive unit by the assembly of at least two coaxial shafts, the assembly of fixed blades and the fan housing.

Advantageously, a sliding device is added onto the stator blading shaft downstream from the first bearing module.

According to a second aspect of the disclosure herein, a rear aircraft part comprises a rear fuselage part and at least one aircraft propulsion unit wherein the static part of the drive unit is connected mechanically to the rear fuselage part. The fan housing, which is situated in the interior of the nacelle, is mechanically independent from the nacelle, and is retained by the assembly of fixed blades to which it is connected. Thus, the loads which are generated by the fan, the fan housing and the assembly of fixed blades are transmitted to the rear fuselage part via the assembly of at least two coaxial shafts. In addition, structural braces connect the nacelle to the rear fuselage part and have dimensions such as to transmit only the loads of the nacelle to the rear fuselage part.

Alternatively, the fan housing is connected mechanically to the nacelle, and is retained by the assembly of fixed blades to which it is connected. The nacelle is thus connected to the static part of the drive unit by the assembly of at least two coaxial shafts, the assembly of fixed shafts and the fan housing. Thus, the loads generated by the fan, the nacelle, the fan housing and the assembly of fixed blades are transmitted to the rear fuselage part via the assembly of at least two coaxial shafts.

BRIEF DESCRIPTION OF THE DRAWINGS

Other characteristics and advantages of the disclosure herein are disclosed by the following description of non-limiting embodiments of the different aspects of the disclosure herein. The description relates to the appended figures which are also provided by way of non-limiting examples of the disclosure herein:

FIG. 1a represents a half side view in cross-section of a first embodiment of a propulsion unit according to the disclosure herein;

DETAILED DESCRIPTION

Figure 1B:
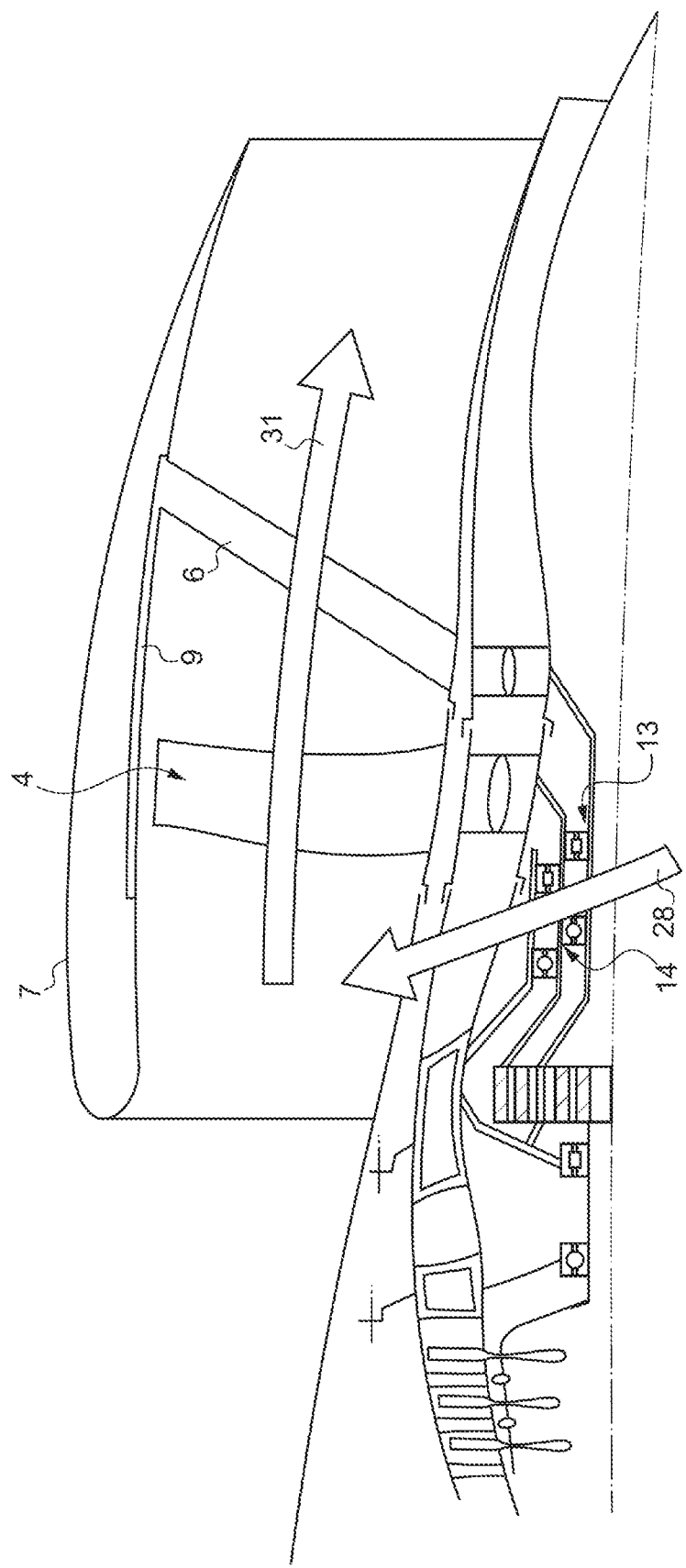
FIG. 1b represents a half side view in cross-section of an alternative embodiment of a propulsion unit according to the disclosure herein.

FIG. 1a represents a propulsion unit for an aircraft with boundary layer ingestion also known as a BLI propulsion unit. BLI is the acronym for Boundary Layer Ingestion. Hereinafter, the relative axial positions of the components of the propulsion unit will be indicated relative to the direction of the flow of propulsion gas passing through it.

Typically, a propulsion unit of this type comprises a drive unit 1 comprising a motor 17 situated at the rear part of the fuselage 27. The motor has a rotor 18 which in general is coupled to a gearbox. The output of the gearbox is connected to a fan shaft 10 in order to rotate a fan 4. The gearbox can be a planetary gear train 19, as indicated in the figures, or any other transmission system which makes it possible to adapt the speed of rotation of the fan shaft 10 to that of the rotor 18. The motor 17 can be a turbine engine, a turbojet, as is mostly the case, or any other type of motor, such as, for example, an electric motor. In the propulsion units of the BLI type mounted on the rear part of the fuselage 27, the motor is situated in the rear part of the fuselage. The fan 4 is situated downstream from the motor 17 and is accommodated in a nacelle 7 which has an inner duct 8 into which the air is aspirated by the fan 4. A fan housing 9 which faces the fan blades 5 is arranged in the inner duct 8 of the nacelle 7. The fan housing 9 is secured on the assembly of fixed blades 6. In addition, the nacelle 7 is connected mechanically to the rear part of the fuselage 27 of the aircraft by structural braces 29 which are generally streamlined and situated upstream from the fan 4. An assembly of fixed blades 6 is accommodated in the fan housing 9 on which it is secured, downstream from the fan 4. The assembly of fixed blades 6 is used to regulate the flow of the propulsion gases at the output from the fan 4, and to support the fan housing 9.

Figure 2:
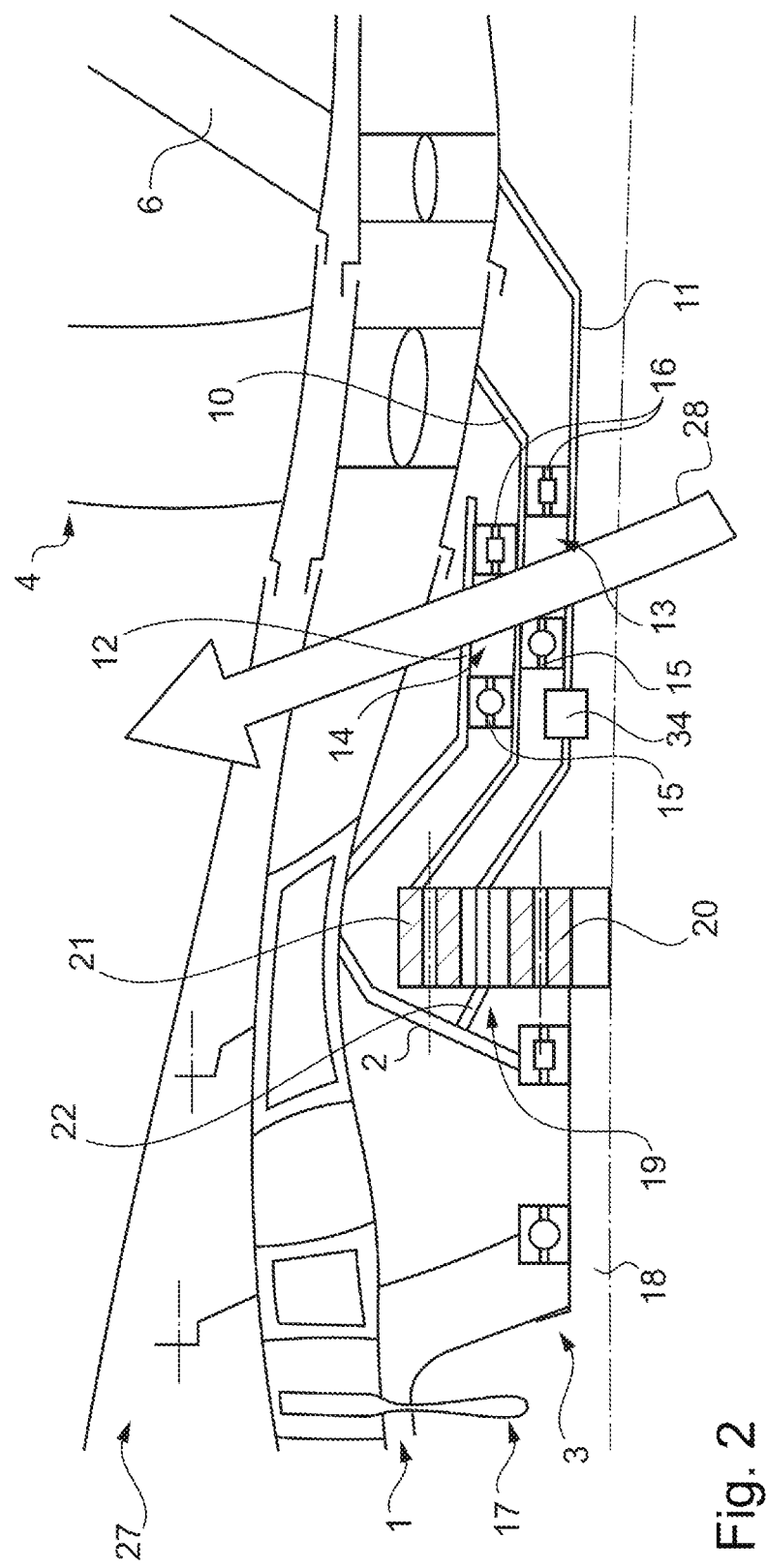
FIG. 2 represents a detailed view of the assembly of coaxial axes in a propulsion unit as represented in the half side views in cross-section in FIGS. 1a and 1b.

As illustrated in FIG. 2, the fan shaft 10, which connects the fan 4 to the rotary part 3 of the drive unit 1 in order to rotate it, is a shaft with a bore in which, along a main part of its length, a stator blading shaft 11 engages. This shaft is connected by one of its ends to the static part 2 of the drive unit 1, and by the other one of its ends to the assembly of fixed blades in order to keep them static. These two shafts which form an assembly of coaxial shafts have a configuration which is compact, and therefore less subject to the deformations of these shafts. In addition, this particular coaxial configuration makes possible a mechanical connection between these two shafts which provides a more rigid assembly, and therefore low deformation of the fan housing 9, of the assembly of fixed blades 6, and of the fan.

This coaxial configuration of the fan shaft 10 and of the stator blading shaft 11 can be extended to a fan hub 12 which is connected mechanically to the static part 2 of the drive unit 1. In fact, the fan hub 12, which is directly connected to the static part of the propulsion unit, surrounds the fan shaft 10 along part of its length. This particular arrangement with the stator blading shaft 11 contained in the fan shaft 10, which itself is contained in the fan hub 12, is particularly compact and rigid. Shorter shafts with less overhang will be less sensitive to the deformations derived from the radial loads generated by the fan 4 and the assembly of fixed blades 6. This configuration of imbricated shafts also makes it possible to obtain a rigid mechanical connection between the assembly of fixed blades 6, the fan 4 and the static part 2 of the drive unit 1, which is connected to the rear fuselage part 27 of the aircraft. This example of an arrangement of the assembly of coaxial shafts has the advantage of providing a fan 4/fixed blade assembly 6/fan housing 9 structure which is particularly rigid and compact, wherein the moments of rotation around the axis of assembly of the coaxial shafts, generated by the assembly of fixed blades 6 and the fan 4, are transmitted via the stator blading shaft 11 and the fan shaft 10 to the planetary gear train, and all the other loads induced by this structure are transmitted to the fan hub 12. Since the fan hub 12 is the outermost of the shafts which are arranged coaxially, its diameter is the largest, thus reinforcing the effect of embedding of the assembly of coaxial shafts, which has a reduced overhang as a result of the compactness of this assembly. This assembly makes it possible to limit substantially the possibilities of deformation, and thus of displacement of this structure relative to the rear part of the fuselage, and between the fan 4 and the assembly of fixed blades 6 and the fan housing.

In the assembly of coaxial shafts, a first bearing module 13 is mounted on the stator blading shaft 11 and in a first bore formed in the interior of the fan shaft 10. This first bearing module 13 guides the fan shaft 19 in rotation around the stator blading shaft 11. In the presence of a fan hub 12, a second bearing module 14 is mounted in a second bore formed in the interior of the fan hub 12 and on the fan shaft 10, in order to guide the latter in rotation in the interior of the fan hub 12. In this form, firstly the assembly of the coaxial shafts makes it possible to obtain a fan/fixed blade assembly which is particularly compact and rigid, and is mechanically connected to the fuselage, such that the deformations between the fan 4, the assembly of fixed blades 6, the fan housing and the rear part of the fuselage 27 are greatly reduced in comparison with the assemblies known in the prior art. Also, the assembly of coaxial shafts thus provided is particularly suitable for transmitting efficiently to the rear part of the fuselage the loads generated by the main fan and the assembly of fixed blades, which loads are absorbed by the bearing modules.

A plurality of types of bearings can constitute the first and second bearing modules 13, 14. According to a preferred embodiment of the disclosure herein, the first and second bearing modules 13, 14 are each constituted by a ball bearing 15 and a roller bearing 16. Other variants are possible, such as the use of conical bearings mounted in the form of an "X" or an "O", or also a combination of roller bearings with a ball stop. In the bearing configuration of the embodiment of the disclosure herein which is described, most of the axial loads derived from the fan 4 are absorbed by the ball bearings 15, which act as axial stops for the fan shaft, whereas the radial loads derived from the fan 4 and from the assembly of fixed blades 6 are absorbed by the roller bearing 16, and to a lesser extent by the ball bearings 15.

In addition, the axial loads which are generated by the assembly of fixed blades 6 and the stator blading shaft 11 can be compensated for by an axial displacement of the stator blading shaft. This axial displacement can take place by the addition of a sliding device 34 on the stator blading shaft 11, upstream from the bearings, thus making it possible to avoid hyperstatic mounting of the stator blading shaft 11, and to compensate for its longitudinal thermal expansions, while preventing the assembly of fixed blades from rotating.

In the drive unit of the propulsion unit, the gearbox connected to the end of the rotor 18 of the motor 17 is advantageously constituted by a planetary gear train 19. The planetary gear train 19 is constituted firstly by an input planet wheel 20 connected to the rotor 18 of the motor 17, and secondly by an output planet wheel which is formed by an inner toothed crown 21 connected mechanically to the fan shaft 4, which it rotates, and thirdly by a fixed planet carrier 22 on which there are mounted the carrier pinions which transmit the movement of rotation of the input planet wheel 20 to the crown 21. Firstly, the planet carrier 22 is connected to the static part 2 of the drive unit 1 and thus to the fuselage, and secondly it is connected to the stator blading shaft 11 by the sliding device 34, thus permitting the axial sliding, but not the rotation, between the planet carrier 22 and the stator blading shaft 11. This particular arrangement of a planetary gear train at the output of the motor makes it possible to obtain a naturally rigid and compact configuration of the assembly of coaxial shafts connected to the main units of the propulsion unit, while blocking the rotation of the assembly of fixed blades. It will be appreciated that other devices which make it possible to adapt the speed of the fan shaft 10 to that of the rotor 18 of the motor 17 can be implemented, as can other configurations of a planetary gear train, which for example has a fixed part other than the planet carrier.

Figure 3:
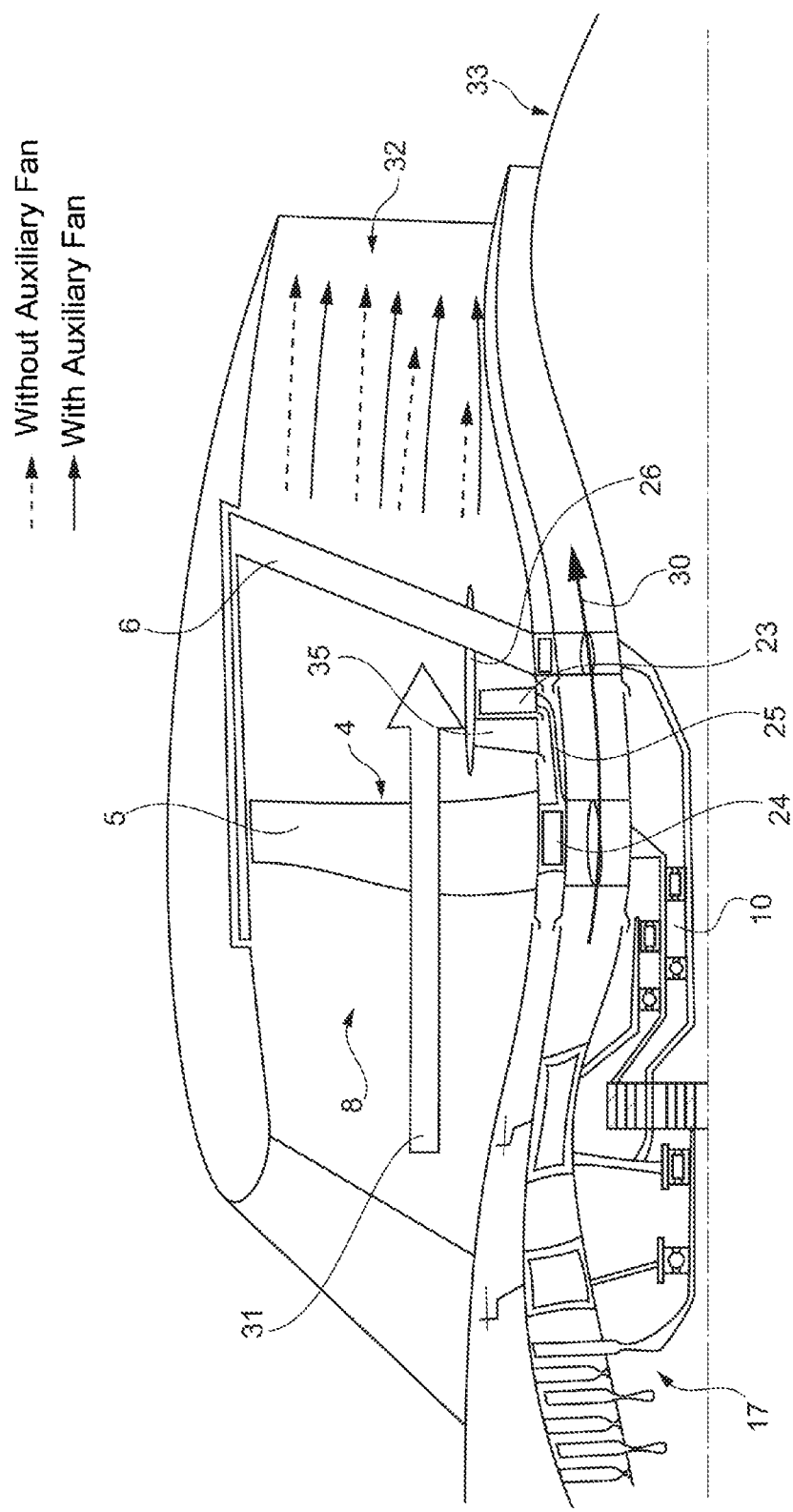
FIG. 3 illustrates a half side view in cross-section of a propulsion unit according to an embodiment of the disclosure herein equipped with an auxiliary fan.

In addition, in a propulsion unit, two flows of propulsion gas are distinguished when the motor is a turbine engine, in particular a turbojet. As illustrated in FIG. 3, a primary flow 30 of propulsion gas flows through the compressor and the combustion chamber of the turbojet while a secondary flow 31 of propulsion gas flows through the fan 4 and the assembly of fixed blades 6. The aerodynamics of the "fan/fixed blade" assemblies is generally designed for conventional propulsion units. When they are transposed into a configuration of the BLI type, as is the case in the aforementioned document according to the prior art, problems of optimization occur. One of these problems concerns the processing of the part of the secondary flow which flows into a region located at the roots of the fan blades 5 and the roots of the assembly of fixed blades 6. In fact, this part of the secondary flow 31 of the propulsion gases is a boundary layer area with a lower speed of flow of the propulsion gases, which gives rise to difficulties for the fan in pressurising this part of the secondary flow entering the propulsion gases at the same level as on the outer periphery of the fan blades 5. The level of pressurisation of the fan 4, also known as the Fan Pressure Ratio, or FPR, which is lower at the root of its blades 5, has a negative impact on the propulsive efficiency of the propulsion unit, and in particular of the propulsion units of the BLI type. In addition, it is found that the drag of the aircraft is not optimal, which leads to excess consumption of fuel.

This problem is solved by increasing the level of pressurisation in the area of the blading roots in order to obtain a higher FPR of the fan 4, of the roots at the ends of the fan blades 5.

For this purpose, as represented in FIG. 3, an auxiliary fan 23 is installed between the fan 4 and the assembly of fixed blades 6 in the area situated at the root of the fan blades 5 and the assembly of fixed blades 6. This auxiliary fan has an outer diameter which is smaller than that of the fan 4. The auxiliary fan can be at a compression stage, as illustrated in FIG. 3, or at a plurality of compression stages. An auxiliary fan fairing 26 in the form of a profiled structure surrounds the auxiliary fan 23. At the upstream end of this auxiliary fan fairing 26, a static regulator 35 is mounted upstream from the auxiliary fan 23. The auxiliary fan fairing 26, which is static, is connected mechanically to the assembly of fixed blades 6. The auxiliary fan 23 for its part is connected mechanically to the fan 4, such that the latter rotates it. This mechanical connection can be formed by an axial extension 25 of a fan disc 24 on which the fan blades 5 are secured by their root, or by any other means. This axial extension 25 extends downstream from the fan disc 24, and the roots of the auxiliary fan 23 blades are secured there. Thus, the fan shaft 10 rotates the fan 4 via the fan disc 24, to which it is connected mechanically, and the fan disc 24 rotates the auxiliary fan 23, via its axial extension 25, which connects them mechanically.

Without an auxiliary fan, the speed of the secondary flow 31 of the propulsion gases in an annular region of an ejection plate 32 decreases as it approaches the inner radius of the inner duct 8, as the secondary flow 31 undergoes there the effect of the viscosity of the boundary layer along the entire fuselage as far as its rear end part forming an ejection cone 33. On the other hand, with the auxiliary fan 23, the speed of the secondary flow 31 of the propulsion gases is homogenized over all of the annular region 32 at the output from the propulsion unit 32, thus increasing the propulsive efficiency of the propulsion unit.

Figure 4:
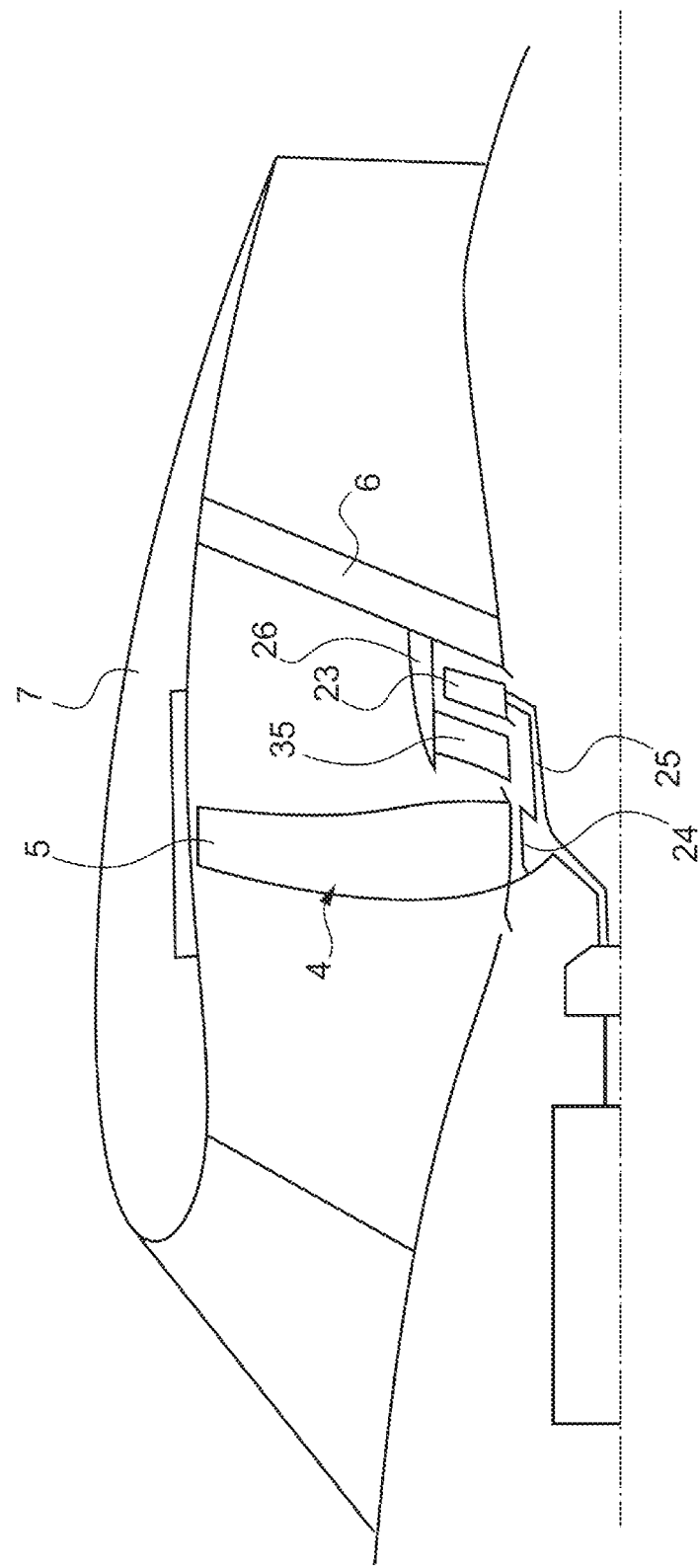
FIG. 4 illustrates a half side view in cross-section of a propulsion unit equipped with an auxiliary fan.

As illustrated in FIG. 3, the particular configuration of the auxiliary fan 23 described above is advantageously combined with the assembly of the coaxial shafts described above, by contributing to its compactness and without detracting from the rigidity thereof. However, an auxiliary fan structure 23 as previously described can be perfectly well integrated in other types of aircraft propulsion units, whether they are of the BLI or conventional type, suspended on the wings, or situated in the rear part of the fuselage. By way of example, FIG. 4 shows the implantation of an auxiliary fan 23 as described above on a propulsion unit similar to that described in the document according to the prior art previously cited.

A propulsion unit as described above can be implanted in different ways on an aircraft. Hereinafter, the propulsion unit is described in a configuration on the rear part of the fuselage of an aircraft. In this configuration, the motor 17 of the drive unit 1 is substantially included in the rear part of the fuselage 27. As indicated above, the motor 17 can be a turbojet, the rear part of which, i.e. mainly the ejection cone 33, can form the rear end of the fuselage of the aircraft. This is the case in particular for propulsion units of the BLI type, and more particularly, but not exclusively, for the rear propulsion units of aircraft known as BLI 360°. The rear part of the fuselage of aircraft of this type can comprise one or a plurality of propulsion units as described above.

Hereinafter, a first variant embodiment of the disclosure herein with a propulsion unit of type BLI 360° mounted in the rear part of the fuselage 27 of an aircraft is described by FIG. 1*a*. In this first variant, the motor 17 of the propulsion unit is a turbojet. The static part 2 of the drive unit 1 is connected mechanically to the rear part of the fuselage 27. The loads 28 generated by the fan 4 and the assembly of fixed blades 6 are transmitted to the fuselage of the aircraft via the assembly of coaxial shafts by the first and second bearing modules 13, 14, as previously described. These are mainly the radial loads generated by the fan 4 and the assembly of fixed blades 6, and the axial loads generated by the fan 4. The moments around the axis of rotation of the fan 4 and the axis of the assembly of fixed blades 6 are transmitted via the blower shaft 10 and the stator blading shaft 11 to the crown 21 and to the planet carrier 22 of the planetary gear train 19. The fan housing 9 for its part is not connected mechanically to the nacelle 7.

In this particular configuration, with the assembly of coaxial shafts being connected to the fuselage, the loads derived from the fan 4, from the assembly of fixed blades 6 and from the fan housing 9 are transmitted to the rear part of the fuselage 27 by this particularly rigid and compact arrangement. This results in a significant reduction of the deformations of this part of the propulsion unit. This reduces correspondingly the gap to be provided between the end of the fan blades 5 and the fan housing, thus increasing the efficiency of the fan. This therefore contributes directly to the optimization of the operation of the propulsion unit.

Structural braces 29 connect the nacelle 7 mechanically to the rear part of the fuselage 27. These structural braces 29 are streamlined, since they are situated at the input of the inner duct 8 via which the fan 4 aspirates the secondary flow 31 of the propulsion gases. With the radial and axial loads generated by the assembly of fixed blades 6 passing via the assembly of coaxial shafts through the first and second bearing modules 13, 14, the structural braces 29 must have dimensions such as to withstand only the aerodynamic stresses acting on the nacelle. Their dimensions can therefore be smaller than those of the conventional structural braces. Their reduced volume therefore has a lower incidence on the secondary flow 31 downstream from the fan 4, thereby optimizing the propulsive efficiency of the propulsion unit thus designed.

A second variant embodiment of the disclosure herein is described below and illustrated in FIG. 1*b*. This second variant embodiment of the disclosure herein is distinguished from the previous one in that the nacelle 7 is connected mechanically to the assembly of fixed blades 6. In this configuration, the fan housing 9 is an integral part of the nacelle 7 or is at least connected to it mechanically. Thus, the aerodynamic stresses sustained by the nacelle 7 are added to the loads 28 generated by the fan 4 and the assembly of fixed blades 6, which are transmitted to the rear part of the fuselage 27 by the assembly of coaxial shafts via the first and second bearing modules 13, 14. The transfer to the rear part of the fuselage 27 of all the loads of the main components of the propulsion unit, i.e. of the nacelle 7, the fan 4 and the assembly of fixed blades 6, via the assembly of the coaxial shafts and the first and second bearing modules 13, 14, is made possible because of the compactness and increased rigidity obtained by this particular assembly according to the disclosure herein. The securing of the nacelle 7 directly on the assembly of fixed blades 6 makes the presence of structural braces upstream from the fan superfluous. Thus, the effect of these tie rods on the secondary flow 31 of propulsion gas upstream from the fan is eliminated, and the efficiency of the propulsion unit is thereby optimized.

In all the variants of the disclosure herein, the combination of the assembly of coaxial shafts, including the stator blading shaft and the fan shaft, with the mechanical connection between the housing and the assembly of fixed blades, makes it possible to optimize the gap between the end of the fan blades and the housing, by reducing the displacements between the fan and the housing. This result is obtained by the rigidification of the fan/housing/fixed blade assembly obtained independently and complementarily, firstly by the assembly of coaxial shafts, and secondly by the connection between the housing and the assembly of fixed blades. The combination of these two effects makes it possible to obtain an assembly which is particularly rigid, and therefore less subject to deformations.

The disclosure herein proposes firstly a particularly compact and rigid structure of the structure formed by the fan 4, the fan housing and the assembly of fixed blades 6, which makes it possible to reduce the gap between the ends of the fan blades 5 and the fan housing 9, on the basis of a mechanical assembly of coaxial shafts. This assembly makes it possible to optimize the structure of the propulsion units of the BLI type, and more specifically those of the BLI 360° type, by reducing the gap necessary between the fan blades 5 and the fan housing 9, and to reduce the size of the structural braces 26. Furthermore, these structural braces 26 can be eliminated when the fan housing 9 is connected mechanically to the assembly of fixed blades 6. In addition, the insertion of an auxiliary fan 23 between the fan 4 and the assembly of fixed blades 6 makes it possible to increase the propulsive efficiency of the propulsion unit, by increasing the pressurisation of the flow of propulsion gas at the root of the fan blades 5 and the fixed blades 6, and thus to increase the propulsive efficiency, and to reduce the drag generated by a propulsion unit/aircraft assembly, in particular of the BLI type.

The combination of the advantages obtained by the different aspects of the disclosure herein makes it possible to obtain a reduction in consumption for an aircraft thus equipped which can range from 2 to 4% compared with that of an aircraft equipped with a propulsion unit of a conventional BLI type.

Although in the above description the particular aspects of the disclosure herein, particularly the assembly of compact and rigid coaxial shafts and the insertion of an auxiliary fan between the fan and the assembly of fixed blades, have been described within the context of a propulsion unit of the BLI type positioned at the rear part of the fuselage, and more particularly a propulsion unit of the BLI 360° type, they can be implemented in other configurations and other types of propulsion unit.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft propulsion unit comprising:
   a drive unit with a static part and a rotary part;
   a fan with fan blades which is rotatable by the rotary part and is downstream from the drive unit;
   an assembly of fixed blades downstream from the fan;
   a nacelle with a fan housing in its lower part; and
   an assembly of at least two coaxial shafts, wherein:
      a fan shaft connects the fan to the rotary part of the drive unit; and
      a stator blading shaft connects the assembly of fixed blades to the static part of the drive unit, and extends concentrically, and for at least part of its length, in an interior of the fan shaft;
   wherein the drive unit comprises:
      a motor with a rotor; and
      a planetary gear train connected to the rotor of the motor and configured to rotate the fan, the planetary gear train comprising:
         an input planet wheel connected to the rotor of the motor;
         an output planet wheel in a form of a crown connected to the fan shaft; and
         a fixed planet carrier connected to the static part of the drive unit and to the stator blading shaft.

2. The aircraft propulsion unit according to claim 1, wherein the assembly of coaxial shafts also comprises:
   a fan hub connected to the static part of the drive unit, and extends concentrically and around the fan shaft over at least part of its length.

3. The aircraft propulsion unit according to claim 2, additionally comprising at least:
   a first module of bearings mounted between the stator blading shaft and the fan shaft; and
   a second module of bearings mounted between the fan shaft and the fan hub.

4. The aircraft propulsion unit according to claim 1, further comprising:
   an auxiliary fan with one or a plurality of stages, disposed between the fan and the assembly of fixed blades, the auxiliary fan being configured to re-pressurize flow of propulsion gas flowing at roots of the fan blades and roots of the assembly of fixed blades.

5. The aircraft propulsion unit according to claim 4, wherein the fan blades are mounted via the roots on a fan disc to form the fan, and further comprising:
   a mainly axial extension of the fan disc extending downstream from the latter fan disc and configured to rotate the auxiliary fan; and
   an auxiliary fan fairing surrounding the auxiliary fan and connected to the assembly of fixed blades.

6. The aircraft propulsion unit according to claim 1, wherein the fan housing in the interior of the nacelle is mechanically independent from the nacelle and is retained by the assembly of fixed blades to which it is connected.

7. The aircraft propulsion unit according to claim 1, wherein the fan housing is connected mechanically to the nacelle and is retained by the assembly of fixed blades to which it is connected, and wherein the nacelle is connected to the static part of the drive unit by the assembly of at least two coaxial shafts, the assembly of fixed blades and the fan housing.

8. A rear aircraft part comprising a rear fuselage part and at least one aircraft propulsion unit, the aircraft propulsion unit comprises:
   a drive unit with a static part and a rotary part;
   a fan with fan blades which is rotatable by the rotary part and is downstream from the drive unit;
   an assembly of fixed blades downstream from the fan;
   a nacelle with a fan housing in its lower part at the fan and the assembly of fixed blades; and
   an assembly of at least two coaxial shafts, wherein:
      a fan shaft connects the fan to the rotary part of the drive unit; and
      a stator blading shaft connects the assembly of fixed blades to the static part of the drive unit, and extends concentrically, and for at least part of its length, in an interior of the fan shaft;

wherein the drive unit comprises:
a motor with a rotor; and
a planetary gear train connected to the rotor of the motor and configured to rotate the fan, the planetary gear train comprising:
an input planet wheel connected to the rotor of the motor;
an output planet wheel in a form of a crown connected to the fan shaft; and
a fixed planet carrier connected to the static part of the drive unit and to the stator blading shaft; and
wherein:
the static part of the drive unit is connected mechanically to the rear fuselage part;
the fan housing, in an interior of the nacelle, is mechanically independent from the nacelle and is retained by the assembly of fixed blades to which it is connected;
loads generated by the fan, the fan housing and the assembly of fixed blades are transmitted to the rear fuselage part via the assembly of at least two coaxial shafts; and
structural braces connect the nacelle to the rear fuselage part and have dimensions such as to transmit only the loads of the nacelle to the rear fuselage part.

9. A rear aircraft part comprising a rear fuselage part and at least one aircraft propulsion unit, the aircraft propulsion unit comprising:
a drive unit with a static part and a rotary part;
a fan with fan blades which is rotatable by the rotary part and is downstream from the drive unit;
an assembly of fixed blades downstream from the fan;
a nacelle with a fan housing in its lower part at the fan and the assembly of fixed blades; and
an assembly of at least two coaxial shafts, wherein:
a fan shaft connects the fan to the rotary part of the drive unit; and
a stator blading shaft connects the assembly of fixed blades to the static part of the drive unit, and extends concentrically, and for at least part of its length, in an interior of the fan shaft;
wherein the drive unit comprises:
a motor with a rotor; and
a planetary gear train connected to the rotor of the motor and configured to rotate the fan, the planetary gear train comprising:
an input planet wheel connected to the rotor of the motor;
an output planet wheel in a form of a crown connected to the fan shaft; and
a fixed planet carrier connected to the static part of the drive unit and to the stator blading shaft; and
wherein:
the static part of the drive unit is connected mechanically to the rear fuselage part;
the fan housing is connected mechanically to the nacelle and is retained by the assembly of fixed blades to which it is connected, the nacelle thus being connected to the static part of the drive unit by the assembly of at least two coaxial shafts, the assembly of fixed blades and the fan housing; and
loads generated by the fan, the nacelle, the fan housing and the assembly of fixed blades are transmitted to the rear fuselage part via the assembly of at least two coaxial shafts.

* * * * *